Patented May 30, 1944

2,350,000

UNITED STATES PATENT OFFICE 2,350,000

PROCESS FOR OBTAINING DETERGING, WETTING, FOAMING, METALLIC SALT DISPERSING, AND EMULSIFYING AGENTS

Jean Paul Amédée Vallernaud, Valence-sur-Rhone, France; vested in the Alien Property Custodian No Drawing. Application December 12, 1939, Serial No. 308,888. In France November 2, 1938

4 Claims. (Cl. 260—401)

The present invention relates to novel detergent, wetting, foaming, metallic salt dispersing agents (more particularly for the dispersion of earth-alkaline salts) and emulsifying agents and to the process for making the same.

For obtaining agents of this kind it has already been suggested to treat with sulphuric acid the product of the condensation of certain fatty acids with monoethanolamine; but the obtained products lacked more or less efficiency with respect to one or more of the detergent, wetting, foaming, dispersing or emulsifying properties. Furthermore, it was impossible directly to obtain products in a finely divided pulverulent form which did not tend to agglomerate.

On the other hand, the use of mono-substituted amines sometimes led to condensation products containing more than one amine molecule and thus one or more of the above mentioned properties were more or less suppressed.

According to the present invention I start from murumuru butter or from fatty acids derived from partially saponified murumuru butter and to condense them with poly-substituted amines, the condensation product so obtained being then treated with an acid capable of yielding a sulphonated or phosphonated derivative or a sulphuric or phosphoric ether.

As poly-substituted amines, methyl-ethylamine, methyl-propylamine, methyl-butylamine, methyl or ethyl-ethanolamine, methyl or ethyl-propanolamine, dodecyl-ethanolamine, oleyl-ethanolamine, ricin-ethanolamine and the like may be used.

As the acid, ordinary mono-hydrated or sulphuric acid containing sulphuric anhydride, chloro-sulphonic acid, phosphoric anhydride acid chlorides or a mixture of the said various bodies and the like may be used.

As a starting product, mixtures of murumuru butter with lauric acid and vegetable oil hydrogenation products condensed either with the above mentioned amines or with the products resulting from the condensation of ammonia or of an amine with the terpenic hydrocarbons and alcohols and the ethers of the latter may be used.

The sulphonation and phosphonation are performed with or without the presence of bodies such as sodium tungstate, ammonium vanadate, chloraldehyde and the like.

The products obtained have properties which are very marked as to the wetting of vegetable and animal textile fibers and of leather and hides as well as of furs; they dissolve and disperse lime soaps and other metallic soaps and yield a copious and persistent foam with impure waters; owing to their detergent properties they are well suited as industrial and domestic cleaning agents or as auxiliary agents for bleaching or dyeing agents; they are also good emulsifying agents. They are obtained directly without any physical or mechanical intervention in the form of a very fine powder of low density and which does not agglomerate.

As a non-limitative example the following will be given: to 200 kilograms of murmuru butter 70 kilograms of methyl monoethanolamine are added and the whole is heated during two hours at 170° C. while removing the condensation water. A solid product is obtained, 100 kilograms of which are treated with 80 kilograms of oleum at 20% while stirring until a perfect solubility in cold water is obtained, in the presence of 10 gramms of metavanadate of ammonia. The obtained sulphonate has sodium carbonate added to it until neutral and it directly yields the soda salt in the form of a very fine and very dry powder.

What I claim is:

1. A process for obtaining detergent, wetting foaming, metallic salt dispersing and emulsifying agents in finely divided pulverulent form and which will not agglomerate, which consists in condensing the fatty acids of murumuru butter with an amine selected from the group consisting of alkyl alkyl amines and alkyl alkylol amines, and then in treating the so obtained condensation product with an acid of the group consisting of chloro-sulphonic acid, phosphoric anhydride acid chloride and sulphuric acid, and fuming sulphuric acid.

2. A process for obtaining detergent, wetting, foaming, metallic salt dispersing and emulsifying agents in finely divided pulverulent form and which will not agglomerate, which consists in condensing murumuru butter with an amine selected from the group consisting of alkyl alkyl amines and alkyl alkylol amines and in treating the so obtained condensation product with an acid of the group consisting of chloro-sulphonic acid, phosphoric anhydride acid chloride, fuming sulphuric acid and sulphuric acid.

3. A process for obtaining detergent, wetting, foaming, metallic salt dispersing and emulsifying agents in finely divided pulverulent form and which will not agglomerate, which consists in condensing with an amine selected from the group consisting of alkyl alkyl amines and alkyl alkylol amines, the fatty acids derived from partially saponified murumuru butter, and then in treating the so obtained condensation product with an acid of the group consisting of chlorosulphonic acid, phosphoric anhydride acid chloride, fuming sulphuric acid and sulphuric acid.

4. A process for obtaining detergent, wetting, foaming, metallic salt dispersing and emulsifying agents in finely divided pulverulent form and which will not agglomerate, which consists in condensing with an amine selected from the group consisting of alkyl alkyl amines and alkyl alkylol amines, the fatty acids derived from partially saponified murumuru butter, and then treating the so obtained condensation product with an acid of the group consisting a chlorosulphonic acid, phosphoric anhydride acid chloride, fuming sulphuric acid and sulphuric acid, in the presence of a body of the group consisting of sodium tungstate, and ammonium vanadate.

JEAN PAUL AMÉDÉE VALLERNAUD.